No. 677,744. Patented July 2, 1901.
J. C. HOWE.
MACHINE FOR STRAIGHTENING AND TRIMMING LINKS OF CHAIN BELTS.
(Application filed Sept. 24, 1900.)
(No Model.) 6 Sheets—Sheet 1.

WITNESSES:
C. S. Frye.
J. A. Walsh.

INVENTOR
John C. Howe,
BY
Chester Bradford
ATTORNEY.

No. 677,744. Patented July 2, 1901.
J. C. HOWE.
MACHINE FOR STRAIGHTENING AND TRIMMING LINKS OF CHAIN BELTS.
(Application filed Sept. 24, 1900.)
(No Model.) 6 Sheets—Sheet 3.

WITNESSES: INVENTOR.
C. S. Frye. John C. Howe,
J. A. Walsh. BY Chester Bradford
ATTORNEY.

No. 677,744. Patented July 2, 1901.
J. C. HOWE.
MACHINE FOR STRAIGHTENING AND TRIMMING LINKS OF CHAIN BELTS.
(Application filed Sept. 24, 1900.)
(No Model.) 6 Sheets—Sheet 4.

WITNESSES:
C. S. Frye.
J. A. Walsh.

INVENTOR
John C. Howe,
BY
Chester Bradford,
ATTORNEY.

No. 677,744. Patented July 2, 1901.
J. C. HOWE.
MACHINE FOR STRAIGHTENING AND TRIMMING LINKS OF CHAIN BELTS.
(Application filed Sept. 24, 1900.)
(No Model.) 6 Sheets—Sheet 5.

WITNESSES:
C. S. Frye
J. A. Walsh

INVENTOR
John C. Howe,
BY
Chester Bradford
ATTORNEY.

No. 677,744.  
Patented July 2, 1901.

J. C. HOWE.  
MACHINE FOR STRAIGHTENING AND TRIMMING LINKS OF CHAIN BELTS.

(Application filed Sept. 24, 1900.)

(No Model.)  
6 Sheets—Sheet 6.

WITNESSES:  
C. S. Frye.  
J. A. Walsh.

INVENTOR  
John C. Howe,  
BY Chester Bradford  
ATTORNEY.

THE NORRIS PETERS CO., PHOTO-LITHO., WASHINGTON, D. C.

UNITED STATES PATENT OFFICE.

JOHN C. HOWE, OF INDIANAPOLIS, INDIANA, ASSIGNOR OF ONE-HALF TO JULIUS M. KAMINSKY AND CLINTON E. PROUSE, OF SAME PLACE.

MACHINE FOR STRAIGHTENING AND TRIMMING LINKS OF CHAIN BELTS.

SPECIFICATION forming part of Letters Patent No. 677,744, dated July 2, 1901.

Application filed September 24, 1900. Serial No. 30,880. (No model.)

*To all whom it may concern:*

Be it known that I, JOHN C. HOWE, a citizen of the United States, residing at Indianapolis, in the county of Marion and State of Indiana, have invented certain new and useful Improvements in Machines for Straightening and Trimming the Links of Chain Belts, of which the following is a specification.

The variety of transmission devices known as "link" or "chain" belts are commonly formed from malleable iron, the separate or individual links before they are finished being ordinary malleable castings. In the finishing, however, a very great degree of accuracy is necessary in order that the belt when assembled shall have each link of the same length from bearing-point to bearing-point, and thus fit accurately on the sprocket-wheels on which it is to run. The patterns for molding such links in order to obtain the best results should be gated at the lip ends, and the castings when broken from the gates or "sprue" have projecting fins or gates, which must necessarily be removed in order to make the links fit for use. Heretofore the customary way of removing these gates has been to grind them off on emery-wheels while the iron is hard before it is annealed, it being in the fittest condition for such grinding at that time. This has involved not only a considerable expense for the emery-wheels themselves, but has necessitated several transportations of the links—first from the foundry to the grinding-shop, thence back to the annealing plant, and thence again to the shop, where they are to be straightened and assembled.

It is the object of my invention to produce a machine which will both remove the gates and straighten the links accurately at the same time and after the links have been annealed, thus saving the transportation in question, the second handling incident to a separate straightening, and a large proportion of the cost of the gate-removing devices, as milling-wheels (such as are used in my machine) can be employed at a small fraction of the cost of the emery-wheels necessary to the above-described old operation.

My invention therefore consists in a machine which receives, assorts, positions, and straightens the annealed malleable-iron links and removes the gates therefrom, leaving them then in perfect condition to be assembled into the link belt or chain.

Referring to the accompanying drawings, which are made a part hereof and on which similar reference characters indicate similar parts, Fig. 3, a side elevation; Fig. 16, an enlarged elevation of the gate at the mouth of the link-guiding chute, and Fig. 17 an enlarged sectional view of the same.

Figures 3, 16, 17:
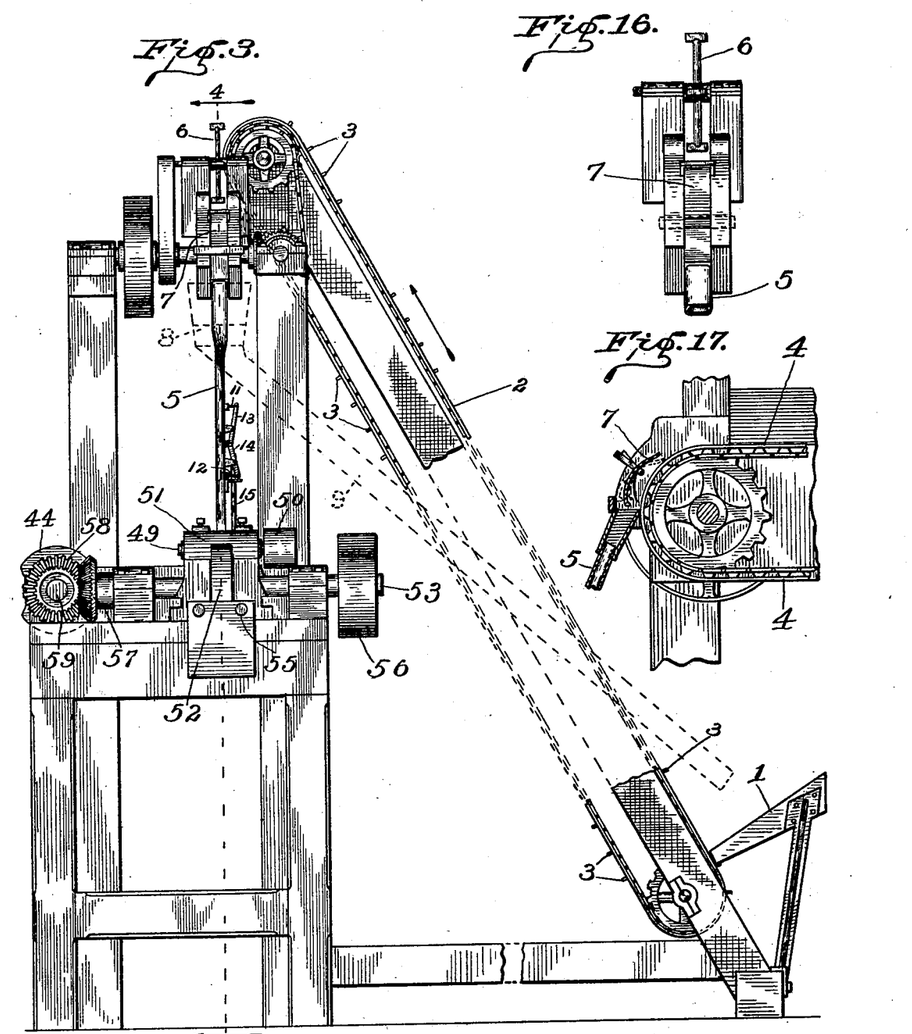

In operation the links from which the chain belt is to be made are taken as they come from the annealing-furnaces and thrown into a hopper 1, (see especially Fig. 3,) whence they are carried by means of a conveyer-belt 2, having fingers 3, to a suitable elevation above the sorting mechanism and are thence deposited on an ordinary short endless carrier 4, which runs transversely to the direction of motion of the carrier 2 and is adapted to deliver the links one by one into the chute 5, whence they are delivered into the straightening and gate-removing mechanism, as will be presently described.

A star-wheel 6 is mounted above the carrier 4, the arms of which move reversely to the direction of said carrier and which extend to a position near enough to said carrier to prevent two links from passing thereunder at one time, the effect being, should one link be piled on another when it reaches this star-wheel, that it would be pushed back or knocked off, so that only the lower one would pass on and be delivered into the chute 5.

Figures 4, 8:
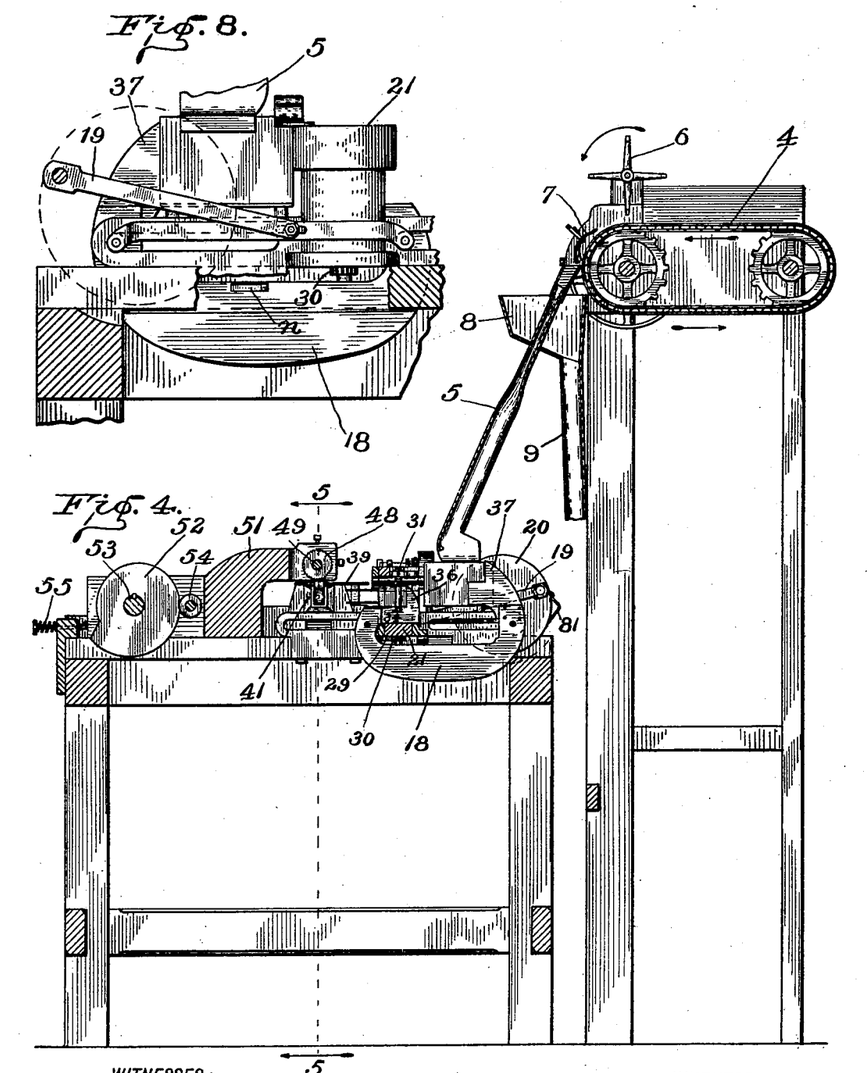
Fig. 4, a vertical sectional view thereof as seen when looking in the direction indicated by the arrows from the dotted line 4 4 in Figs. 1 and 3.
Fig. 8, a detail sectional view showing the connection of the driving-pitman with the link-carriage as seen when looking in the direction indicated by the arrows from the dotted line 8 8 in Fig. 9.

A pivoted gate 7 is mounted in front of the carrier 4 just where the links drop therefrom into the chute 5. This is so constructed and arranged that if the chute becomes filled to its mouth, as is frequently the case, the upper link will hold this gate down close to the surface of the carrier, so that the succeeding links will pass over outside of said gate and fall into a hopper 8, and thence descend by a chute 9 back to the hopper 1. The general arrangement of this device is shown in Fig. 4, while its construction is better shown in the enlarged views, Figs. 16 and 17. As will be observed, especially in Fig. 17, the gate is curved and is pivoted just above the center, so that the lower end is heavier. The upper edge is thus kept sufficiently away from the carrier 4 so that a single link will pass under it; but before a link can escape from the lower edge of the gate it must move it somewhat on its pivot. When the links are passing through freely, this is done instantaneously and does not interrupt the flow of links. When, however, the chute 5 becomes full, the upper link will of course remain within the space inclosed by the lower portion of this gate, thus holding its upper edge close to the surface of the carrier 4, with the result that the following link or links will pass over outside this gate to the hopper 8 and thence back to the hopper 1, as above stated.

Figures 2, 13, 14, 15:
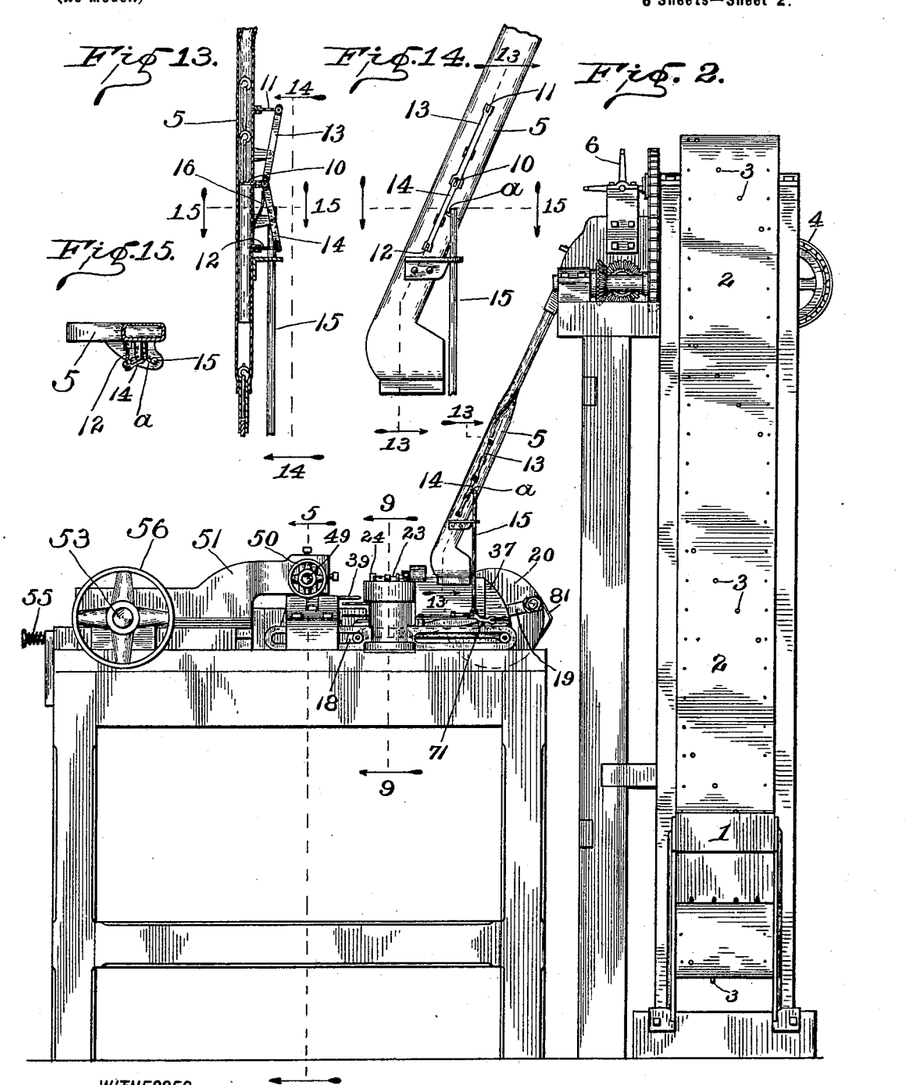
Fig. 2, a front elevation of the same.
Fig. 13, a detail sectional view of the link-conveying chute as seen from the dotted line 13 13 in Figs. 2 and 14.
Fig. 14, a fragmentary elevation of a portion of said link-conveying chute as seen from the dotted line 14 14 alongside Fig. 13.
Fig. 15, a horizontal sectional view of said link-conveying chute as seen when looking downwardly from the dotted line 15 15 in Fig. 13.

The link-chute 5, as best illustrated in Figs. 2, 4, 7, 13, 14, and 15, is designed to deliver the links one by one to position in the straightening and gate trimming apparatus, and in order that they may be delivered individually as desired a stop device is provided, which prevents more than one link reaching the lower end of this chute until the preceding link has been removed therefrom. As best shown in Fig. 13, three little stop-plungers 10, 11, and 12 are adapted to pass into this chute across the path of travel of the links and prevent the passage of such links except as said plungers are operated. These plungers are carried by levers 13 and 14, suitably pivoted to arms provided therefor on the chute 5 and which are operated in one direction by an arm $a$ on a rock-shaft 15 and in the other by a spring 16. The operation is, as the levers 13 and 14 are operated, and the plungers are alternatively pushed in and out, so that the links will drop from one to the other and be held thereby, as will be readily understood. The rock-shaft 15 is connected to suitable mechanism at its lower end, which is operated by the link straightening and trimming mechanism, as will be presently described. At the lower end this link-chute 5 is widened out, and at the extreme lower end the sides are brought together, so that the bodies (but not the curved ends or lips) of the links may pass down thereinto, the result being that the links at the extreme bottom end of this chute are suspended by the lip ends, as indicated at the lower end of Fig. 13. Consequently said links as they pass from the chute into the straightening and trimming mechanism move in a horizontal direction or sidewise out of the lower end of the chute. Should any of the links descend lip end downwardly, they will tip over when they reach the bottom end of the chute 5, being aided in this motion by the peculiar form of the lower end of the chute, including the lip 17 therein, this being best shown in Fig. 7.

Figure 6:
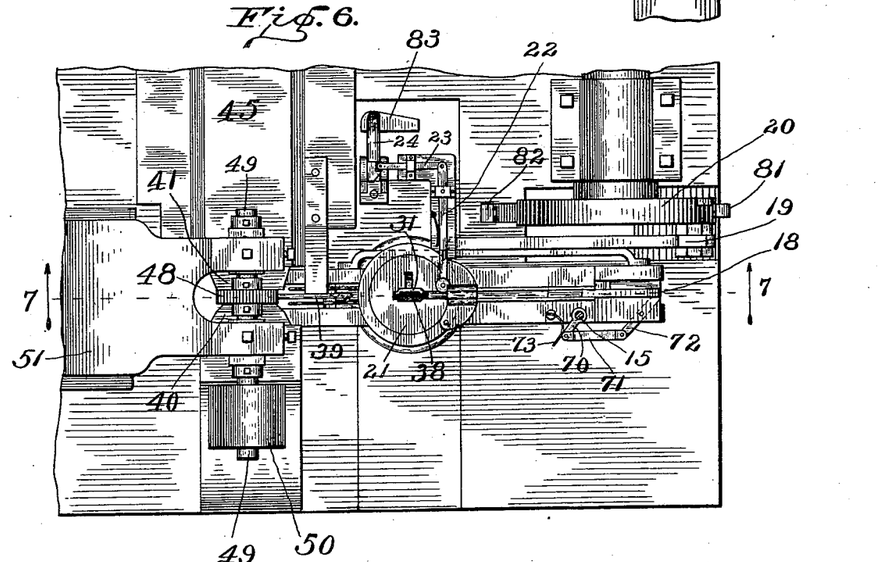
Fig. 6, a fragmentary top or plan view similar to a portion of Fig. 1, but on an enlarged scale.

The rod 15 is mounted in bearings provided therefor in the frame of the machine proper and on the chute 5, as shown. A rigid arm 70 (see especially Fig. 6) extends out from this rod near the lower end, and the same is connected, by means of a link 71, with a lever 72, which is pivoted to the frame of the machine, as best shown in Fig. 6, and extends into the path of the link-carrier 18. On the opposite side of the arm 71 is a spring 73, which serves to actuate said arm and the rod 15 in the opposite direction when pressure on the lever 72 is relieved. The operation is as the link-carrier 18 reciprocates that the rod 15 is rocked in its bearings, so that its arm $a$ at the upper end alternatively swings against the lever 14 and away from said lever. As it swings against said lever it pushes the inner end of the same and of the lever 13 connected thereto, together with the plunger carried thereby, inwardly, and as it swings away the spring 16 is permitted to push the connected ends of the levers 13 and 14 outwardly and the outer ends carrying the plungers 11 and 12 inwardly. The links are therefore by means of these plungers alternatively caught and released, and thus permitted a step-by-step movement down through the chute synchronously with the movement of the link-carrier 18. Thus the links are delivered to the adjusting, straightening, and trimming mechanism exactly as required.

Figure 9:
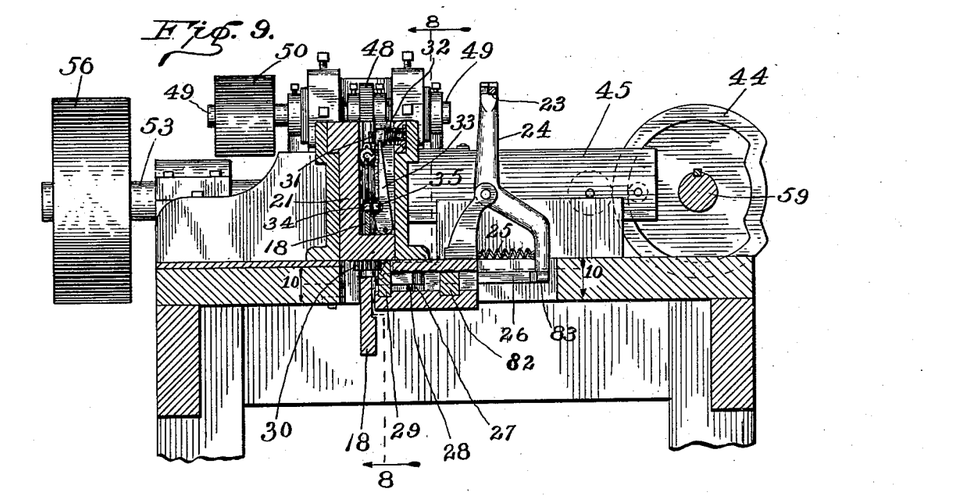
Fig. 9, a transverse detail sectional view, on an enlarged scale, as seen from the dotted line 9 9 in Figs. 1 and 2.
Figure 10:
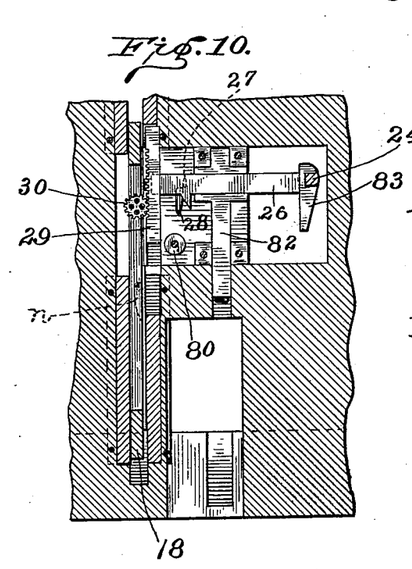
Fig. 10, a detail horizontal sectional view as seen from the dotted line 10 10 in Fig. 9.
Figure 11:
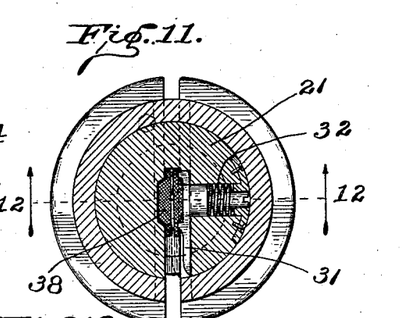
Fig. 11, a detail sectional view of the link-turning center or turret as seen from the dotted line 11 11 in Fig. 12.
Figure 12:
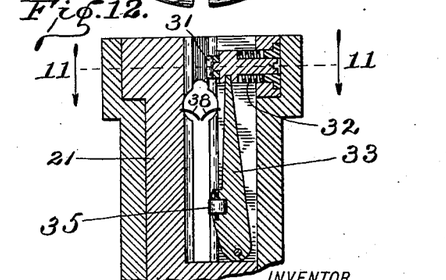
Fig. 12, a detail sectional view as seen from the dotted line 12 12 in Fig. 11.

The link is carried forward out of the lower end of the chute 5 by the reciprocating carrier 18, which is driven by a pitman 19 from the crank-wheel 20. The link by this reciprocating carrier is by one stroke driven forward into the center 21 and by a second stroke thereof carried to between the grippers and under the trimming-wheel. If the link is in the proper position when it enters the center 21, said center remains practically passive, constituting a mere passage-way, in which it remains for the period between the first and second strokes of the carrier, dropping meanwhile from the level at which it emerges from the chute 5 to the level at which it is carried forward to be straightened and trimmed. If, however, the link is "wrong side to," the outer or convex surface of its lip will come in contact with a lever 22, (see Fig. 6,) which operates a latch 23, which engages with a suitable catch on the upper end of the lever 24, withdrawing said latch from engagement therewith. When this is done, the spring 25, (see Fig. 9,) which is in tension, will pull the lower end of the lever 24 inwardly, driving the slide 26 (see Fig. 10) into engagement with the notch $n$ (see Figs. 8 and 10) in the side of the link-carrier 18. The motion of the slide 26 is just sufficient to carry a projection 27 thereon past a projection 28 on the adjacent portion of the frame, and as the link-carrier 18 begins its return movement the slide 26 will be held into the position to which it has been moved until the projection 27 passes by and escapes from said projection 28. The slide 26 also passes through the rack-bar 29, which is capable of moving therewith. Said rack-bar 29 engages with the spur cog-wheel 30, which is fixedly secured to the lower end of the rotative center 21, and the movement of said rack-bar actuated by the link-carrier through the medium of the parts named revolves the center 21 a half-turn, thus turning the link around to the position desired ready to be further moved.

The link which is at the time being treated in entering the center 21 is driven in against a spring-pressed plate 31, operated by a spring 32, and said plate holds said link firmly enough against the opposite sides of the opening in the center formed to receive it to support it at that point until released. This plate 31 is adapted to be operated by a lever 33, mounted in the center 21 by means of a friction-point on the link-carrier 18, which friction-point is preferably in the form of a roller 34, (see Fig. 7,) which will come in contact with a similar friction-point, preferably also a roller 35, on the face of the lever 33. This permits the link to drop to the next level, and the mechanism is so timed that this occurs after the second driving-point 36 has receded to behind the link, the previous motion of said link having been occasioned by the driving-point 37. When the link drops to the second position, as described, its head or lip end strikes two pieces of soft fabric 28, provided to receive it and which prevents it from bouncing out of place. The driving-point 36 then drives the link forward, when the eye passes over the rod 39 and between the dies 40 and 41, by which it is gripped, straightened, and held firmly until the gate or rough portion has been milled or trimmed off.

Referring again for a moment to the slide 26, it has, as will be observed, (see Fig. 10,) an inclined projection upon one side, which as it reaches the end of its movement is adapted to come in contact with the side of a projection 80, (which is preferably in the form of a roller,) and which has the effect to push the slide outwardly again, distending the spring 25. At this time a cam 81 on the wheel 20 comes in contact with a tailpiece 82 on said slide and pushes the same back to its original position. The lever 24 has a prolongation 83, forming a bearing for the end of the slide 26 and against which it moves as it travels back and forth.

Figures 1, 5:
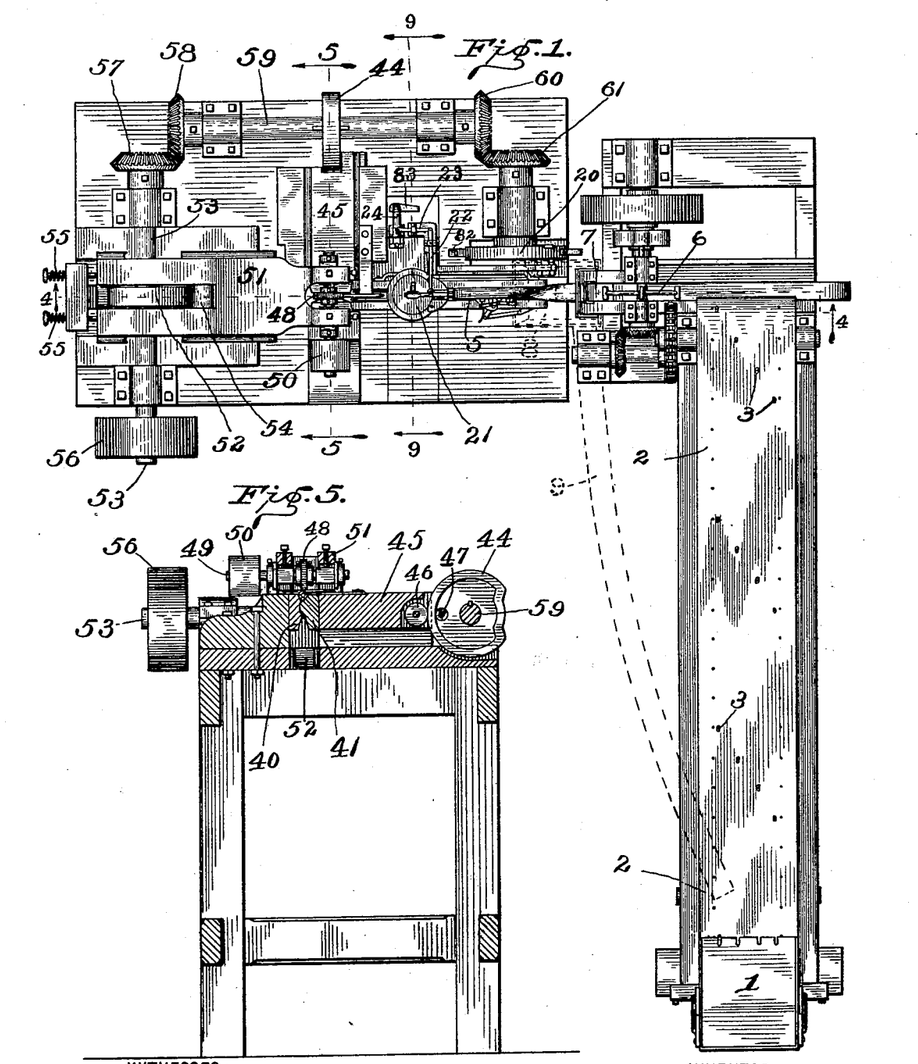
Figure 1 is a top or plan view of such a machine.
Fig. 5, a transverse sectional view as seen when looking in the direction indicated by the arrows from the dotted line 5 5 in Figs. 1, 2, and 4.

As best shown in Fig. 5, the gripping and straightening die 40 is stationary, being mounted on a rigid portion of the frame. The gripping and straightening die 41 is movable and is operated by the cam-wheel 44, which is timed to drive the plunger 45, carrying said die back and forth at the proper times. Antifriction-trucks 46 and 47 contribute to the ease of movement. As will be seen, the truck 46 is larger and stronger than the truck 47, and its shaft has bearings at both ends, while the truck 47, being merely for the purpose of withdrawing the plunger, is smaller and lighter and is carried from one end only, running on the inside of the flange on the cam-wheel 44.

Figure 7:
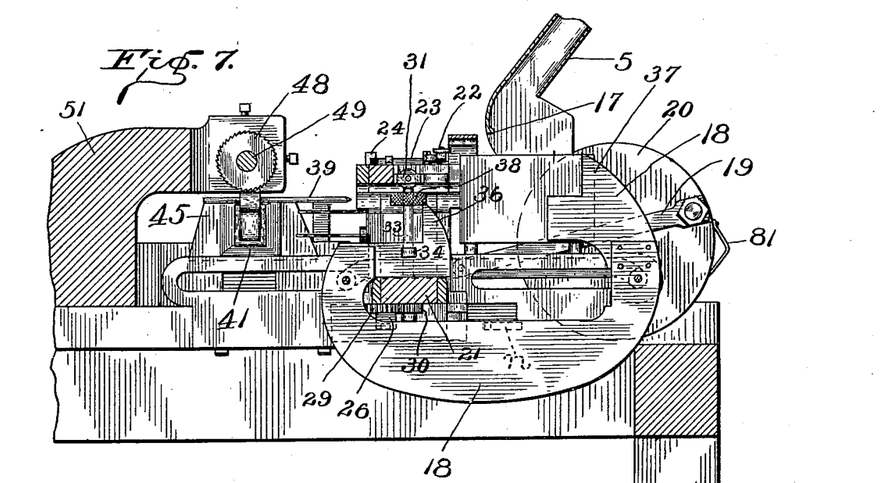
Fig. 7, a detail sectional view similar to a portion of Fig. 4, but on an enlarged scale, the same being also a view as seen when looking in the direction indicated by the arrows from the dotted line 7 7 in Fig. 6.

As best shown in Figs. 4, 6, and 7, the milling or trimming wheel 48 is mounted on a shaft 49, which is driven by a belt (not shown) running to a pulley 50 thereon. The shaft 49 is mounted in a heavy reciprocating frame 51, which is driven forward by means of a cam-wheel 52 on a shaft 53, the cam-face operating against an antifriction-truck 54. It is withdrawn for a new operation, as is best shown in Fig. 1, by means of retracting-springs 55, which engage with the ends of the frame 51.

As best shown in Fig. 1, the most of the mechanism is driven from the shaft 53, which is itself driven by a belt (not shown) running to a pulley 56 thereon from some suitable source of power. At its opposite end it is provided with a bevel-gear 57, which, through a similar gear 58, drives the shaft 59 on which the cam 44 is mounted and which at the other end has another bevel gear-wheel 60, which by means of a similar gear-wheel 61 drives the shaft to the combined crank and cam wheel 20.

The operation of this machine may be recapitulated as follows: The links as they come from the annealing-furnaces are delivered to the hopper 1 and thence carried by the conveyer 2, the cross-conveyer 4, and the link-chute 5 to the positioning, straightening, and trimming mechanism. Thence they are propelled by strokes of the link-carrier 18 to the straightening and trimming devices. In case the link in question is not properly positioned the center 21 is given a half-revolution between the first and second strokes of the link-carrier, revolving it to proper position, as above described. In case, however, it enters this mechanism properly positioned the said center is not revolved, but the link passes straight on through. When the link has reached its position between the gripping and straightening dies, said dies are actuated, firmly gripping the link in position and pressing it until it is straight and true. At the same time the reciprocating frame or carriage 51 advances, and the cutter 48, rotating at a suitable speed, passes over the top of the link, trimming off the protuberances which may be left when the same is severed from the gate, and reducing every link to exactly the same size and thickness at this point. As one link moves forward the one which has just been treated emerges, and the various parts of the machine are so timed as to perform their operations successively, and the links are delivered one by one from this machine to wherever they may be desired. They are usually delivered to another machine which operates in connection with the one here illustrated, by means of which the links are assembled into chains. This machine, however, is intended to form the subject-matter of a separate application, and therefore will not be shown or described herein.

Having thus fully described my invention, what I claim as new, and desire to secure by Letters Patent, is—

1. In a machine for straightening and trimming the links for chain belts, the combination, of a chute by which the links are conveyed thereto, a traveling carrier leading to said chute, an elevating-carrier for depositing the links thereon, and a star-wheel positioned above said traveling carrier near the point of its delivery to said chute in near proximity thereto and revolving oppositely to the travel thereof, whereby links are prevented from remaining piled on top of each other at the point where they are delivered to said chute, substantially as set forth.

2. The combination, in a machine of the class described, of an elevating-carrier for carrying the links to the feeding devices, a transverse traveling carrier arranged to receive the links therefrom and deliver them to a chute leading to the operating mechanism, said chute arranged to deliver the links to the machine proper, and a device positioned above the entrance to said chute for preventing the clogging of said chute, substantially as set forth.

3. The combination, in a machine of the class described, with the chute by which the links are conveyed thereinto and the carrier leading to said chute, of a pivoted curved gate positioned at the end of said carrier and above said chute, said gate being operated by the links as they pass, whereby when the chute is filled the succeeding links will be by said gate switched overboard and not permitted to enter the chute, substantially as set forth.

4. The combination, in a machine of the class described, with the operating mechanism, of a chute for delivering the links one by one to the machine, three plungers mounted to slide across said chute and connected to a jointed and pivoted bar arranged to operate the two end plungers oppositely to the center plunger, and mechanism connected therewith for operating the same, substantially as set forth.

5. The combination, in a machine of the class described, of a link-carrying chute leading thereto, stop-plungers arranged to intercept the links in their descent, levers for operating said stop-plungers, a rock-shaft extending from a position adjacent to said levers down to alongside reciprocating mechanism of the machine and provided with arms at its upper and lower ends, a lever extending into the path of the reciprocating mechanism, a link connecting one of the arms on the rock-shaft with said lever, and springs acting oppositely to the force which drives said rock-shaft, substantially as and for the purposes set forth.

6. The combination, in a machine of the class described, with the mechanism thereof, of a chute for leading the links to said mechanism, said chute being flattened and widened at the lower end and provided with a projection, as 17, whereby the links will be caused to turn over when they reach the lower end of said chute if not already in the proper upright position, and means for carrying the links horizontally across and out of the flattened lower end of said chute, substantially as set forth.

7. The combination, in a machine of the class described, of a reciprocating link-carrier, a revoluble center, mechanism connecting said carrier and said center terminating in a lever the end whereof extends to alongside the lip of the link during the first movement thereof by the link-carrier, said lever end being adapted to pass within said lip when the link is in one position or to be moved thereby when in another position, whereby the center is caused to revolve or permitted to remain at rest according to the position of the link passing through, substantially as and for the purposes set forth.

8. The combination, in a machine of the class described, of a double link-carrier, and a revolving center arranged alongside said link-carrier, said carrier being adapted to force the link into said center at its first movement and to force the same out of said center to between gripping and straightening dies at its second movement, and mechanism adapted to be set in motion by the passage of the link when in one position or permitted to remain at rest when the link is in the other position, substantially as and for the purposes set forth.

9. The combination, in a machine of the class described, of a revolving center whereby a link in its passage through the machine may be caused to assume a uniform position, said center consisting of a rotary structure having ingress and egress openings for the link and provided with a spur-wheel, a rack-bar arranged alongside said spur-wheel, a slide passing through said rack and adapted to engage with the link-carrier, connections consisting of levers extending from said slide up to alongside the path of the link, and means whereby the same may be actuated when the link is in one position and permitted to remain at rest when the link is in the other position.

10. The combination, in a machine of the class described, of a rotating center whereby the link is positioned for subsequent operations, a spring-mounted gripping-jaw in said center whereby the link is gripped and held when forced into said center until the link-carrier is retracted, an arm for operating said gripping-jaw having a suitable contact-point, and said link-carrier also having a contact-point adapted to strike the contact-point on said arm and thus release the link and permit the same to fall to its second position, substantially as set forth.

11. The combination, in a machine of the class described, of a reciprocating link-carrier, 18, having two link-actuating projections, 36 and 37, one at a higher level than the other, a link-receiving center, 21, having a spring-actuated jaw, 31, and a jaw-actuating lever, 33, said reciprocating link-carrier being provided with a contact-point adapted to actuate said lever 33 when said carrier is retracted and thus permit the link to drop from the first to the second positions, substantially as set forth.

12. The combination, in a machine of the class described, with the link-carrier, of a link-receiving rotatable center, 21, having suitable openings to receive the link, means whereby the link is held at one elevation until released, and shoulders to receive the link when the same is permitted to descend, said shoulders being protected by a fabric as described.

13. The combination, in a machine of the class described, of suitable link-positioning apparatus, suitable gripping and straightening dies, and a reciprocating carriage carrying a milling-wheel whereby protuberances on the links may be trimmed off.

14. The combination, in a machine of the character described, of suitable link-positioning mechanism, and gripping and straightening dies adapted to receive the link and straighten and hold the same, one of said dies being stationary and the other adapted to reciprocate, the plunger of the reciprocating die being operated by a cam-wheel, and the positioning mechanism and said cam-wheel being geared together whereby they are caused to move in fixed relation to each other, substantially as set forth.

15. The combination, in a machine of the character described, of a link receiving and positioning mechanism, the gripping and straightening dies, a reciprocating carriage carrying a milling-wheel for trimming the links, a cam for operating one of said gripping and straightening dies, and a cam for operating the carriage carrying the milling-wheel, the several mechanisms being geared together and caused to operate synchronously, substantially as set forth.

16. The combination, in a machine of the character described, of suitable gripping and straightening dies, a carriage carrying a milling-wheel, a cam whereby said milling-wheel carriage is driven forward, springs whereby said milling-wheel carriage is retracted, and means whereby the gripping and straightening dies are caused to operate simultaneously with said milling-wheel, substantially as set forth.

In witness whereof I have hereunto set my hand and seal, at Indianapolis, Indiana, this 13th day of September, A. D. 1900.

JOHN C. HOWE. [L. S.]

Witnesses:
CHESTER BRADFORD,
JAMES A. WALSH.